United States Patent
Takahashi et al.

(10) Patent No.: US 9,133,811 B2
(45) Date of Patent: Sep. 15, 2015

(54) METHOD AND APPARATUS FOR CONTROLLING START-UP OF INTERNAL COMBUSTION ENGINE

(75) Inventors: Hideaki Takahashi, Yokohama (JP); Hajime Yasuda, Fuchu (JP); Kenichi Satou, Yokohama (JP); Tohru Shibata, Isehara (JP); Hiroyuki Itoyama, Yokohama (JP); Hirotada Muraki, Kawasaki (JP); Susumu Shimasaki, Ebina (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 218 days.

(21) Appl. No.: 13/995,750

(22) PCT Filed: Dec. 27, 2011

(86) PCT No.: PCT/JP2011/080279
§ 371 (c)(1),
(2), (4) Date: Jun. 19, 2013

(87) PCT Pub. No.: WO2012/091043
PCT Pub. Date: Jul. 5, 2012

(65) Prior Publication Data
US 2013/0282262 A1   Oct. 24, 2013

(30) Foreign Application Priority Data
Dec. 27, 2010  (JP) ................. 2010-290176

(51) Int. Cl.
*F02N 11/00* (2006.01)
*F02D 9/00* (2006.01)
*F02D 41/06* (2006.01)
*F02N 19/00* (2010.01)
*F02D 11/10* (2006.01)
*F02D 41/00* (2006.01)

(52) U.S. Cl.
CPC ................ *F02N 19/00* (2013.01); *F02D 11/10* (2013.01); *F02D 41/0002* (2013.01); *F02D 41/062* (2013.01); *F02D 2200/0414* (2013.01); *F02D 2200/101* (2013.01); *F02D 2200/703* (2013.01); *F02N 11/00* (2013.01); *Y02T 10/42* (2013.01)

(58) Field of Classification Search
CPC .......... F02N 19/00; F02M 1/14; F02D 11/10; F02D 41/062; F02D 41/0002; F02D 9/00; F02D 2009/025; F02D 2009/0227
USPC .................... 123/179.18, 339.1, 399; 701/113
See application file for complete search history.

(56) References Cited

U.S. PATENT DOCUMENTS

| 2008/0022958 A1 | 1/2008 | I et al. |
| 2009/0056672 A1 | 3/2009 | Whitney et al. |
| 2013/0173145 A1* | 7/2013 | Yasuda et al. ................. 701/113 |

FOREIGN PATENT DOCUMENTS

| CN | 101377156 A | 3/2009 |
| JP | 08-232645 A | 9/1996 |

(Continued)

*Primary Examiner* — Hai Huynh
(74) *Attorney, Agent, or Firm* — Foley & Lardner LLP

(57) ABSTRACT

The internal combustion engine (1) has a throttle (23) for controlling an intake air amount and performs start-up through cranking. As the cranking is initiated, an atmospheric pressure is detected and an initial opening is set accordingly. The controller (31) controls the throttle (23) to the initial opening when the cranking is initiated, and controls the throttle to start to increase the throttle opening from the initial opening at a predetermined timing after the cranking initiation. By setting the initial opening based on one or both of the atmospheric pressure and the temperature at the time of cranking initiation, the intake negative pressure and the intake air amount are optimized.

6 Claims, 13 Drawing Sheets

31 ENGINE CONTROLLER
32 AIR FLOW METER
33 POSITION SENSOR
34 PASE SENSOR
35 OXYGEN SENSOR
36 TARTER SWITCH
37 TEMPERATURE SENSOR
42 ACCELERATOR PEDAL
   DEPRESSION AMOUNT SENSOR

(56) References Cited

FOREIGN PATENT DOCUMENTS

| JP | 3586975 | B2 | 8/2004 |
|---|---|---|---|
| JP | 2007-205293 | A | 8/2007 |
| JP | 2007-278073 | A | 10/2007 |
| JP | 2008-057380 | A | 3/2008 |
| JP | 2008-223733 | A | 9/2008 |
| JP | 2010-048098 | A | 3/2010 |

* cited by examiner

31 ENGINE CONTROLLER
32 AIR FLOW METER
33 POSITION SENSOR
34 PASE SENSOR
35 OXYGEN SENSOR
36 TARTER SWITCH
37 TEMPERATURE SENSOR
42 ACCELERATOR PEDAL
DEPRESSION AMOUNT SENSOR

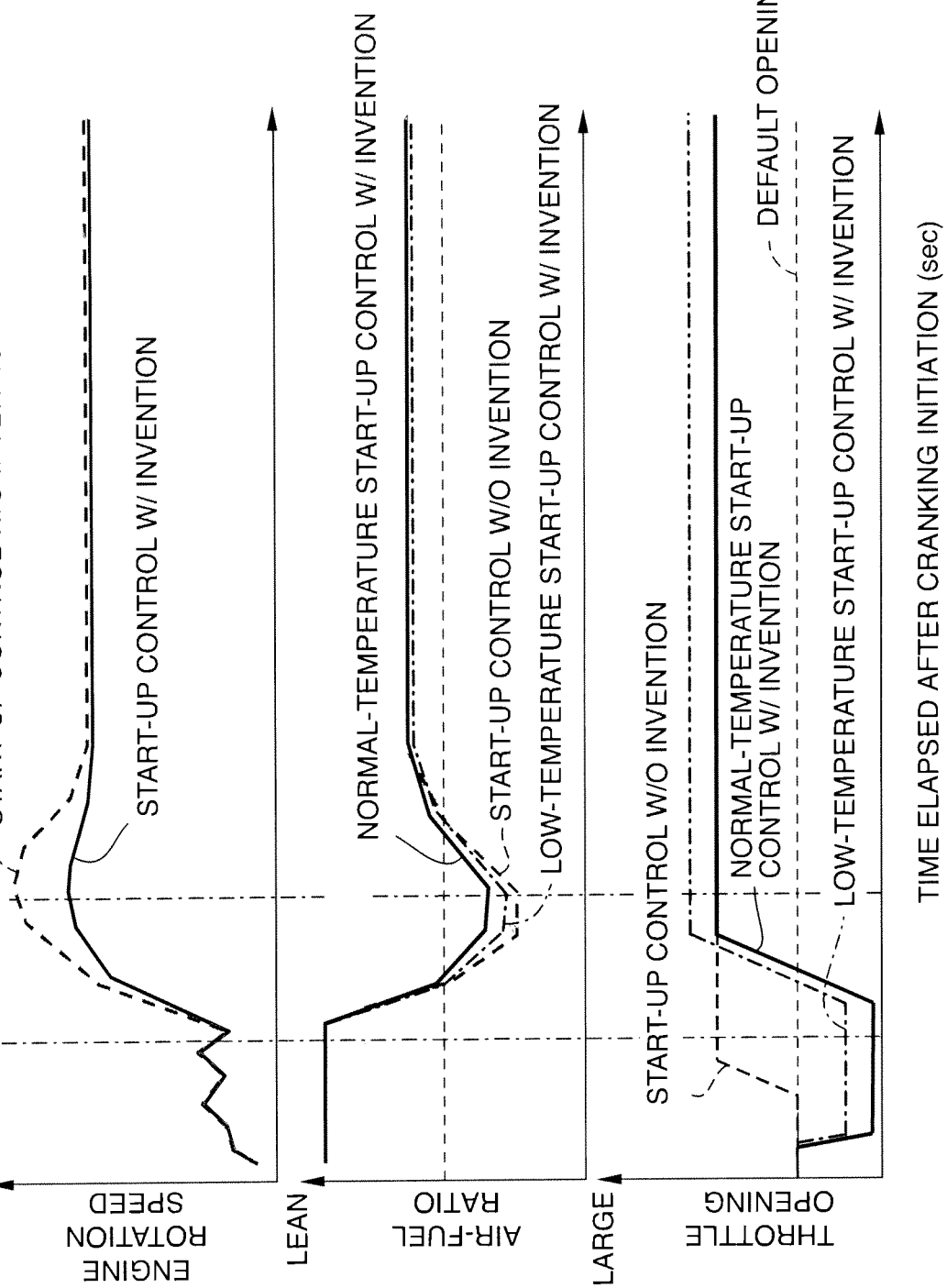

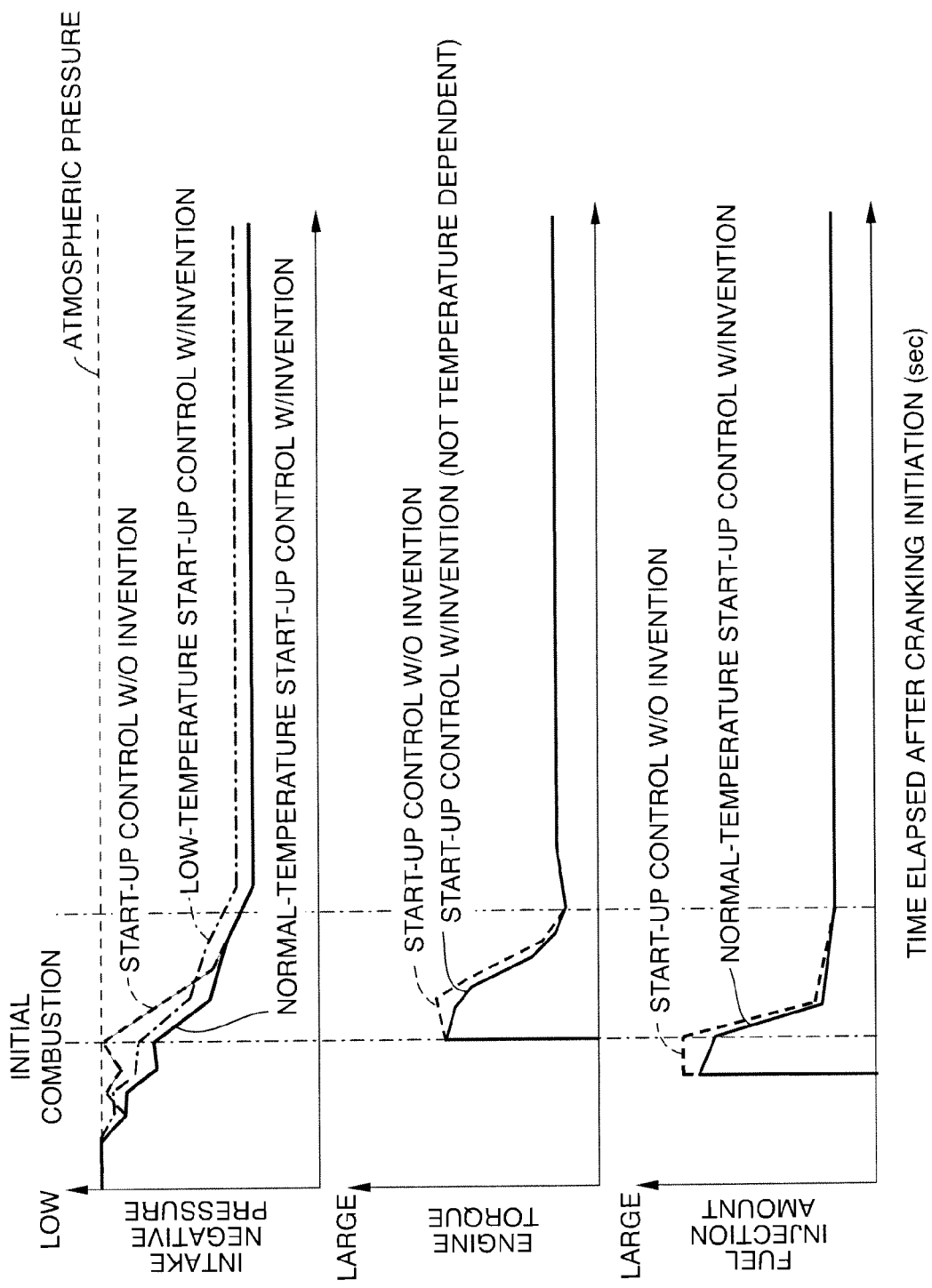

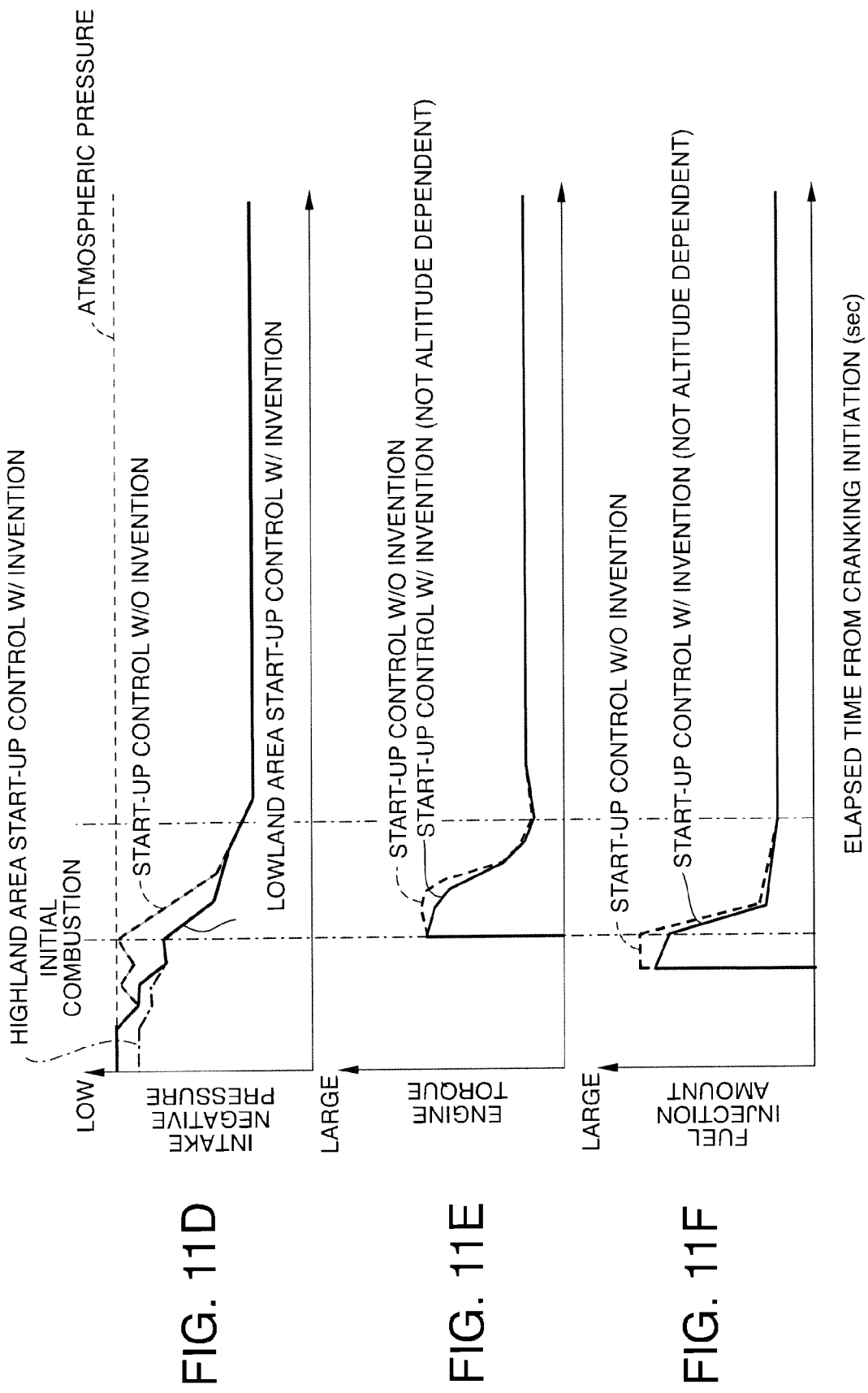

METHOD AND APPARATUS FOR CONTROLLING START-UP OF INTERNAL COMBUSTION ENGINE

FIELD OF THE INVENTION

This invention relates to start-up control of an internal combustion engine.

BACKGROUND OF THE INVENTION

When a spark ignition type internal combustion engine starts through cranking, it is desirable that an engine rotation speed be controlled to early increase to a target idle rotation speed by suppressing excessive increase in the engine rotation speed after complete combustion in order to suppress fuel consumption and obtain a desirable exhaust gas composition.

JP 2007-278073A, published by Japan Patent Office in 2007, discloses engine control for this purpose. Specifically, this control includes control of an intake throttle opening of an internal combustion engine, control of a fuel injection amount, and control of an ignition timing of injected fuel.

According to this prior art, increase of hydrocarbons (HC) in the exhaust gas is prevented by suppressing an excessive increase in the engine rotation speed generated after the engine rotation speed reaches a target idle rotation speed while controlling an air-fuel ratio to a stoichiometric air-fuel ratio.

SUMMARY OF THE INVENTION

When the internal combustion engine starts, in order to suppress discharge of hydrocarbons (HC) by promoting vaporization of fuel, it is desirable to early develop an intake negative pressure. For this reason, according to the prior art, a throttle is closed when cranking of the internal combustion engine is initiated, and the throttle is then opened when the internal combustion engine performs complete combustion.

In the start-up of the internal combustion engine, it is necessary to develop an intake negative pressure and obtain an intake air amount necessary to maintain the idle rotation speed. A frictional resistance for cranking the internal combustion engine changes depending on a temperature. As the frictional resistance increases, an engine torque required to maintain the idle rotation speed increases accordingly. In addition, a density of the intake air of the internal combustion engine varies depending on an atmospheric pressure and affects a substantial intake air amount. More specifically, the air density of the intake air is different between lowland and highland areas.

In this way, the intake air amount required for cranking the internal combustion engine is inevitably influenced by an atmospheric pressure, an altitude, and an engine temperature at the time of cranking initiation. In other words, if the throttle opening during cranking is maintained in a fixed position including a closed position as in the case of the prior art, it is difficult to satisfactorily develop the intake negative pressure and obtain the intake air amount depending on a start-up condition.

It is therefore an object of this invention to implement throttle control capable of satisfactorily promoting development of the intake negative pressure during start-up of the internal combustion engine and supplying the air amount necessary to maintain the idle rotation speed with an optimal balance at all times irrespective of a temperature or an atmospheric pressure.

In order to achieve the above object, this invention provides a method of controlling start-up of an internal combustion engine that has a throttle for controlling an intake air amount and performs the start-up through cranking. The method comprises detecting cranking initiation of the internal combustion engine, detecting one or both of an engine temperature and an atmospheric pressure at the time of cranking initiation of the internal combustion engine, setting an initial opening based on one or both of the engine temperature and the atmospheric pressure at the time of cranking initiation, controlling a throttle opening of the throttle to the initial opening at the time of cranking initiation, and starting to increase the throttle opening of the throttle from the initial opening at a predetermined timing after cranking initiation.

The details as well as other features and advantages of this invention are set forth in the remainder of the specification and are shown in the accompanying drawings.

BRIEF DESCRIPTION OF THE DRAWINGS

FIGS. 10A to 10F are timing charts illustrating a relationship between a start-up coolant temperature and variations of an engine rotation speed, an air-fuel ratio, the throttle opening, an intake negative pressure, an engine torque, and a fuel injection amount caused by the start-up throttle control of the internal combustion engine executed by the engine controller according to this invention;

FIGS. 11A to 11F are timing charts illustrating a relationship between the atmospheric pressure at the time of cranking initiation and variations of the engine rotation speed, the air-fuel ratio, and the throttle opening, the intake negative pressure, the engine torque, and the fuel injection amount caused by the start-up throttle control of the internal combustion engine executed by the engine controller according to this invention.

DESCRIPTION OF THE PREFERRED EMBODIMENTS

Figure 1:
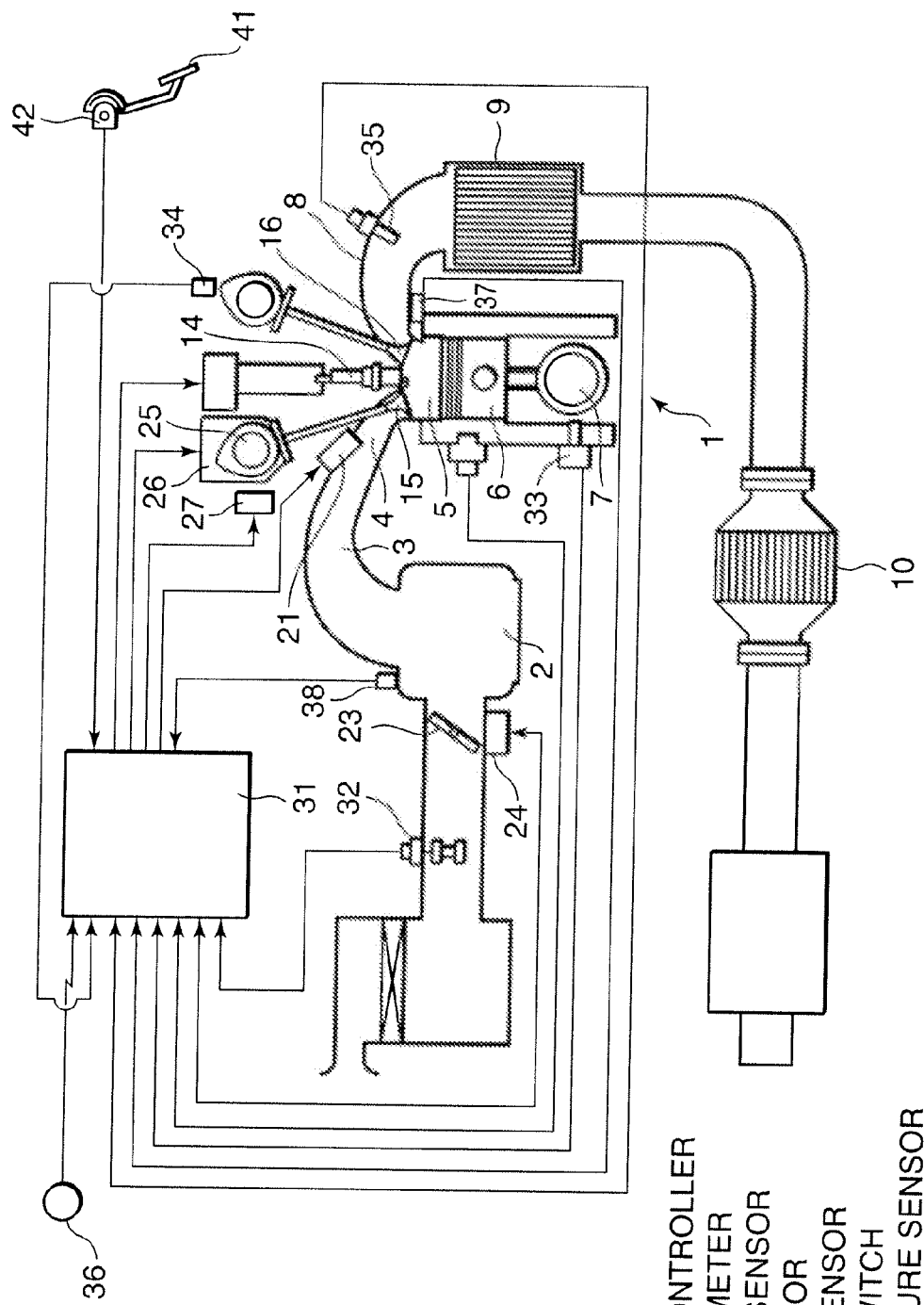
FIG. 1 is a schematic diagram of an apparatus for controlling an internal combustion engine according to this invention.

Referring to FIG. 1 of the drawings, in a four-stroke cycle internal combustion engine 1 for a vehicle, an intake air is accumulated in an intake collector 2 after adjusting an amount thereof by a throttle 23. The accumulated air is then introduced into a combustion chamber 5 of each cylinder through an intake manifold 3 and an intake valve 15. The internal combustion engine 1 is a multi-cylinder spark ignition type reciprocating engine.

An intake port 4 of each cylinder is provided with a fuel injector 21. The fuel injector 21 intermittently injects fuel into the intake port 4 at predetermined timings. The fuel injected into the intake port 4 is mixed with the intake air to form a fuel mixture. The fuel mixture is confined in the combustion chamber 5 by closing the intake valve 15. The fuel mixture confined in the combustion chamber 5 of each cylinder is compressed by a piston 6 provided in each cylinder and is ignited by a spark plug 14.

The gas pressure caused by combustion of the fuel mixture pushes down the piston 6 to generate a reciprocal motion of the piston 6. The reciprocal motion of the piston 6 is converted into a rotational motion of the crankshaft 7. The gas after combustion is discharged to an exhaust passage 8 as an exhaust gas through an exhaust valve 16.

The exhaust passage 8 is provided with an exhaust manifold connected to each cylinder. The exhaust manifold is provided with a first catalyst 9 as a start-up catalyst. The exhaust passage 8 extends to an underfloor of a vehicle. The exhaust passage 8 in the underfloor portion is provided with a second catalyst 10.

Both the first and second catalysts 9 and 10 are, for example, a three-way catalyst. The three-way catalyst can simultaneously and efficiently remove hydrocarbons (HC), carbon monoxide (CO), and nitrogen oxides (NOx) contained in the exhaust gas when the air-fuel ratio remains in a narrow range centered at a stoichiometric air-fuel ratio.

Operation of the internal combustion engine 1 is controlled by an engine controller 31. Specifically, the engine controller 31 controls an intake air amount of the throttle 23, a fuel injection amount of the fuel injector 21, and an ignition timing of the spark plug 14.

The engine controller 31 comprises a microcomputer having a central processing unit (CPU), a read-only memory (ROM), a random access memory (RAM), and an input/output interface (I/O interface). The engine controller 31 may comprise a plurality of microcomputers.

For the control purposes described above, the engine controller 31 receives input signals corresponding to detection values from an air flow meter 32 that detects the intake air amount, a crank angle sensor that detects a reference rotation position of the internal combustion engine 1 as well as a unit rotation angle, an oxygen sensor 35 that detects an oxygen concentration of the exhaust gas and is provided in the upstream of the first catalyst 9 of the exhaust passage 8, an accelerator pedal depression amount sensor 42 that detects a depression amount of an accelerator pedal 41 of a vehicle, a starter switch 36 used by a vehicle driver to instruct cranking of the internal combustion engine 1, a temperature sensor 37 that detects an engine coolant temperature, and a pressure sensor 38 that detects an intake air pressure. The crank angle sensor comprises a position sensor 33 that detects a unit rotation angle of the internal combustion engine 1 and a phase sensor 34 that detects a reference rotation position of the internal combustion engine 1.

The engine controller 31 sets a basic fuel injection amount of the fuel injector 21 based on such input signals and performs feedback control for the air-fuel ratio in the combustion chamber 5 based on the input signal from the oxygen sensor 35 provided in the upstream of the first catalyst 9.

In the cold start-up of the internal combustion engine 1, it is desirable that the feedback control of the air-fuel ratio be implemented early by activating both the catalysts 9 and 10 and the oxygen sensor 35 early. For this purpose, the oxygen sensor 35 is heated by a heater immediately after the start-up. The engine controller 31 determines activation of the oxygen sensor 35 based on the input signal from the oxygen sensor 35. The engine controller 31 initiates the feedback control of the air-fuel ratio as the oxygen sensor 35 is activated.

The catalysts 9 and 10 are not limited to the three-way catalyst. For example, in some vehicles, the internal combustion engine is driven at a lean air-fuel ratio by supplying a fuel mixture to the combustion chamber 5 at an air-fuel ratio leaner than the stoichiometric air-fuel ratio in a low-load driving range to improve fuel efficiency after completing the engine warm-up. In such a vehicle, it is necessary to absorb nitrogen oxides (NOx) generated in a large amount at a lean air-fuel ratio. In this regard, the second catalyst 10 may comprise a NOx trap catalyst having a function of the three-way catalyst. This invention may also be applicable to the vehicle that uses such a catalyst.

Control of the intake air amount using the throttle 23 is performed by controlling a throttle motor 24 that drives the throttle 23. A torque required by a driver is input as a depression amount of the accelerator pedal 41. The engine controller 31 defines a target torque based on the depression amount of the accelerator pedal 41. The engine controller 31 computes the target intake air amount for obtaining the target torque and outputs a signal corresponding to the target intake air amount to the throttle motor 24 to control the opening of the throttle 23.

The internal combustion engine 1 comprises a variable valve lift mechanism 26 having an articulated link that continuously changes a valve lift amount of the intake valve 15 and a variable valve timing mechanism 27 that continuously and variably controls a rotational phase difference between the crank shaft 7 and an intake valve camshaft 25 to advance or delay an open/close timing of the intake valve 15.

The engine controller 31 performs control for start-up of the internal combustion engine 1 as explained below:

(1) Delay the ignition timing from a start-up ignition timing to a predetermined ignition timing, for example, a catalyst warm-up promoting ignition timing in a stepwise manner or at a sufficient change speed with which at least the engine rotation speed is prevented from an excessive increase after it reaches a target idle rotation speed; and (2) Start to open the throttle 23 before a predetermined time period from the timing at which the engine rotation speed reaches the target idle rotation speed in order to supply the combustion chamber 5 with the intake air amount necessary to maintain the engine rotation speed at the target idle rotation speed after the engine rotation speed reaches the target idle rotation speed.

Through the aforementioned control, the warm-up of the first catalyst 9 is promoted. In addition, it is possible to prevent increase of hydrocarbons in the exhaust gas by suppressing the excessive increase in the engine rotation speed after it reaches the target idle rotation speed while stabilizing the air-fuel ratio to the stoichiometric air-fuel ratio.

A control routine executed by the engine controller 31 for this purpose will now be described. First, with reference to FIGS. 2 to 5, description will be made for control of the ignition timing, the throttle opening, and the fuel injection amount in the start-up of the internal combustion engine 1 according to the prior art. Then, description will be made for control according to this invention.

Figure 2:
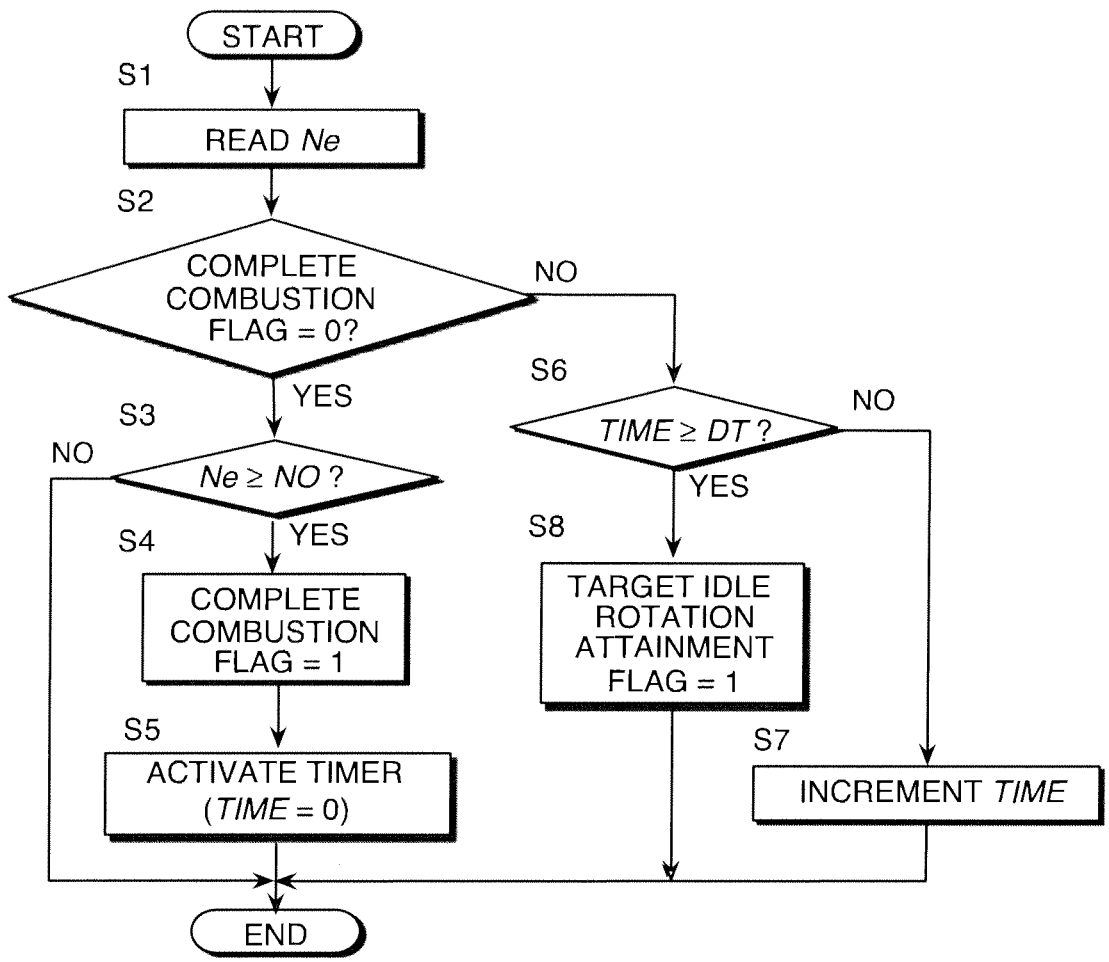
FIG. 2 is a flowchart illustrating a routine for setting a complete combustion flag and a target attainment flag executed by an engine controller according to a prior art.

FIG. 2 illustrates a routine for setting a complete combustion flag and a target idle rotation attainment flag. The engine controller 31 executes this routine at certain intervals, for example, every 100 milliseconds, while an ignition switch provided in a vehicle is turned on. In addition, the engine controller 31 is activated when the ignition switch is switched from OFF to ON, and the engine controller 31 remains in an operation state while the ignition switch is turned on.

In a step S1, the engine controller 31 reads the engine rotation speed Ne. The engine rotation speed Ne is computed based on the input signal from the crank angle sensor comprising the position sensor 33 and the phase sensor 34.

In a step S2, the engine controller 31 determines the complete combustion flag. The complete combustion flag is a flag indicating whether or not the internal combustion engine 1 has achieved a complete combustion. The complete combustion flag is initially set to zero when the ignition switch is switched from OFF to ON. For this reason, when the routine is executed for the first time, the complete combustion flag is set to zero. When the complete combustion flag is zero, the engine controller 31 compares the engine rotation speed Ne and the complete combustion rotation speed N0 in a step S3. The complete combustion rotation speed N0 is provided to determine whether or not the internal combustion engine 1 is subjected to complete combustion. For example, the complete combustion rotation speed is set to 1,000 revolutions per minute (RPM). When the engine rotation speed Ne does not reach the complete combustion rotation speed NO, the engine controller 31 terminates the routine immediately.

Meanwhile, when the engine rotation speed Ne reaches the complete combustion rotation speed NO, that is, in the case of Ne≥N0, the engine controller 31 sets the complete combustion flag to unity in a step S4.

Then, in a step S5, the engine controller 31 activates a timer. The timer measures time elapsed from the timing at which the engine rotation speed Ne reaches the complete combustion rotation speed NO, and the timer value TIME is reset to zero when the timer is activated. After processing of the step S5, the engine controller 31 terminates the routine.

In this way, if the complete combustion flag is set to unity in the step S4, determination of the step S2 is changed to be negative in a next routine execution, and as a result, the processing of steps S6 to S8 is performed.

In the step S6, the engine controller 31 compares the timer value TIME and a predetermined value DT. The predetermined value DT means a time interval from the timing at which the engine rotation speed Ne reaches the complete combustion rotation speed N0 to the timing at which the engine rotation speed Ne reaches the target idle rotation speed NSET. The predetermined value DT is set through experiment or simulation in advance.

Since the timer value TIME immediately after the timer is activated is smaller than the predetermined value DT, determination of the step S6 is negative. In this case, the engine controller 31 increases the timer value TIME by a predetermined increment value in a step S7. The predetermined increment is set to a value corresponding to a routine execution cycle.

In this way, the timer value TIME increases whenever the routine is executed. As a result, the timer value TIME becomes equal to or greater than the predetermined value DT, and determination of the step S6 is changed from negative to affirmative. In this case, the engine controller 31 sets the target idle rotation attainment flag, which indicates a fact that the rotation speed has reached the target idle rotation speed NSET, to unity in the step S8. It should be noted that the target idle rotation attainment flag is initially set to zero. In other words, the target idle rotation attainment flag is reset to zero when the ignition switch or the starter switch is switched from OFF to ON. After the processing of the step S7 or the step S8, the engine controller 31 terminates the routine.

As described above, the engine controller 31 determines whether or not the internal combustion engine 1 performs the complete combustion, and the engine rotation speed reaches the target idle rotation speed by repeatedly executing the routine for setting the complete combustion flag and the target idle rotation attainment flag at certain cycles immediately after the ignition switch is switched from OFF to ON. Then, the engine controller 31 sets corresponding flags. In the step S6, it is determined that the engine rotation speed reaches the target idle rotation speed NSET when time corresponding to the predetermined value DT elapses after the internal combustion engine 1 performs complete combustion. However, this determination may be made by directly comparing the target idle rotation speed NSET and the engine rotation speed Ne detected by the crank angle sensor.

Figure 3:
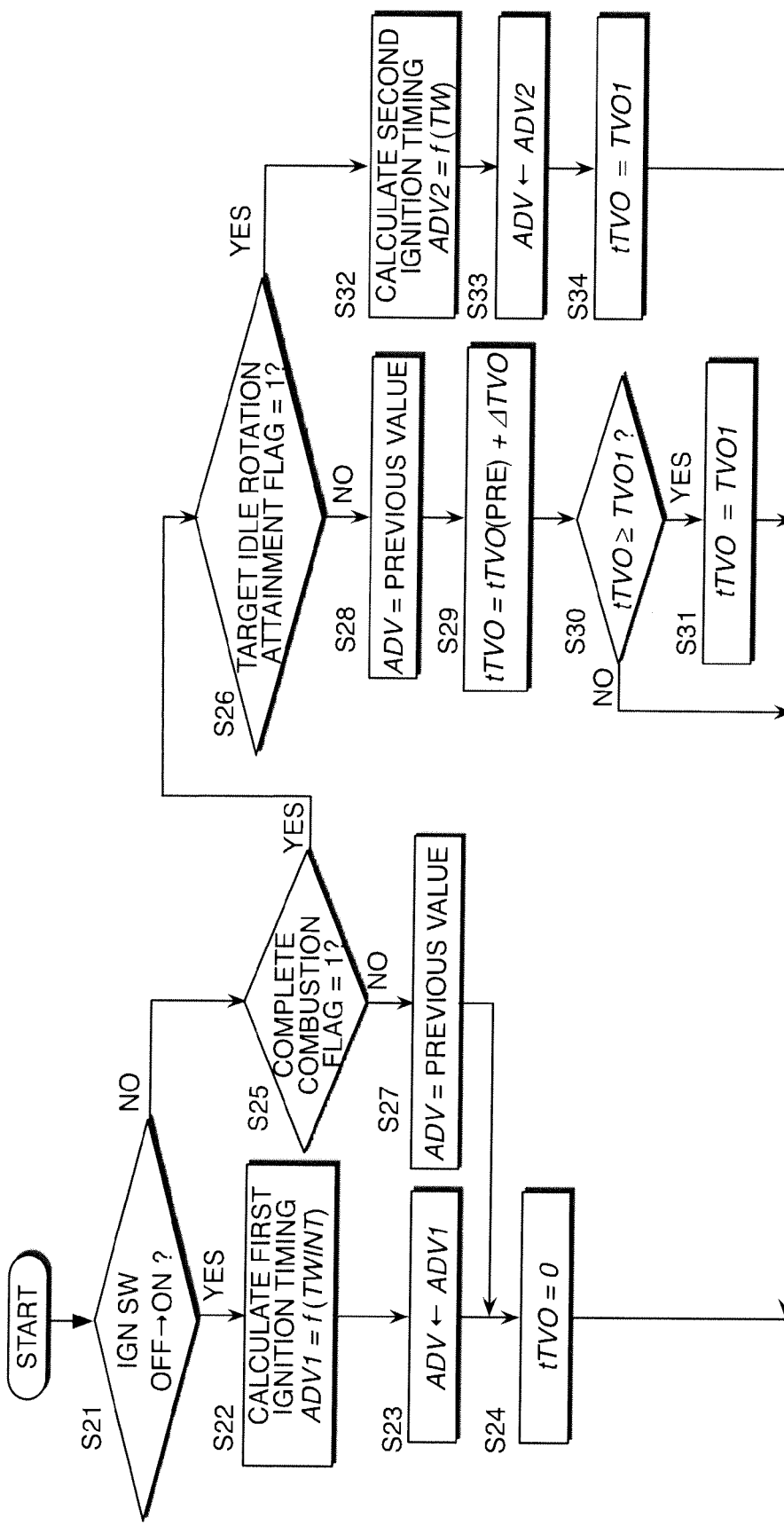
FIG. 3 is a flowchart illustrating a routine for controlling an ignition timing and a throttle opening executed by the engine controller according to the prior art.

FIG. 3 illustrates a routine for controlling the ignition timing and the throttle opening. The engine controller 31 executes this routine subsequently to the routine of FIG. 2 at certain intervals, for example, every 100 milliseconds while the ignition switch is turned on.

In a step S21, the engine controller 31 determines whether or not the current routine execution timing is immediately after the ignition switch is switched from OFF to ON.

If the determination in the step S21 is affirmative, the engine controller 31 incorporates the coolant temperature TW of the internal combustion engine 1 detected by the temperature sensor 37 as the start-up coolant temperature TWINT in a step S22. The engine controller 31 computes a first ignition timing ADV1 depending on the start-up coolant temperature TWINT. The first ignition timing ADV1 is an optimal ignition timing for the engine start-up. Here, the first ignition timing ADV1 is computed as a value significantly advancing from the ignition timing of the normal driving.

In a step S23, the engine controller 31 sets an ignition timing instruction value ADV to a value equal to the computed first ignition timing ADV1.

In a step S24, an initial value is input to a target throttle opening tTVO. The initial value is set to, for example, zero. After the processing of the step S24, the engine controller 31 terminates the routine.

Meanwhile, if the determination in the step S21 is negative, the engine controller 31 determines whether or not the complete combustion flag is unity in the step S25. If it is determined that the complete combustion flag is not unity, the engine controller 31 sets the ignition timing instruction value ADV to the previous value in a step S27. In this way, the ignition timing instruction value ADV is maintained at the first ignition timing ADV1 until it is determined that the internal combustion engine 1 has achieved complete combustion After the processing of the step S27, the engine controller 31 sets the target throttle opening tTVO to zero, which is the initial value, in the step S24 and terminates the routine.

In this way, until the complete combustion is performed after the cranking of the internal combustion engine 1 is initiated, the ignition timing instruction value ADV is maintained at the first ignition timing ADV1, and the target throttle opening tTVO is maintained at zero.

Meanwhile, if the complete combustion flag is unity in the determination of the step S25, the engine controller 31 determines whether or not the target idle rotation attainment flag is unity in a step S26. If it is determined that the target idle rotation attainment flag is not unity, the engine controller 31 sets the ignition timing instruction value ADV equal to the previous value in a step S28. Therefore, even after it is determined that the internal combustion engine 1 has achieved complete combustion, the ignition timing instruction value ADV is maintained at the value equal to the first ignition timing ADV1 until the timer value TIME reaches the predetermined value DT, that is, until the engine rotation speed Ne reaches the target idle rotation speed NSET.

After the processing of the step S28, the engine controller 31 computes the target throttle opening tTVO based on following Equation (1) in a step S29.

$$tTVO = tTVO(PRE) + \Delta TVO \qquad (1)$$

where, ΔTVO=increment; and
tTVO(PRE)=previous value of tTVO.

tTVO(PRE) in Equation (1) denotes a previous value of the target throttle opening, whose initial value is zero.

A predetermined increment ΔTVO in Equation (1) is an increment of the target throttle opening per predetermined time. The predetermined increment ΔTVO is determined such that the target throttle opening tTVO reaches the target idle opening TVO1 when the engine rotation speed Ne reaches the target idle rotation speed NSET. Here, the target idle opening TVO1 is a throttle opening corresponding to the minimum intake air amount necessary to generate a torque capable of allowing the internal combustion engine 1 to maintain the target idle rotation speed NSET. The value of the target idle opening TVO1 is set through experiment or simulation in advance.

After the target throttle opening tTVO is set in the step S29, the engine controller 31 compares the target throttle opening tTVO and the target idle opening TVO1 in a step S30.

When the determination of step S26 is changed to be negative for the first time, that is, immediately after the engine rotation speed Ne reaches the target idle rotation speed NSET, the target throttle opening tTVO does not exceed the target idle opening TVO1. In this case, the engine controller 31 terminates the routine without advancing the process.

In the subsequent routine execution, through the processing of the step S29, the target throttle opening tTVO increases by a predetermined increment ΔTVO whenever the routine is executed. As a result, as the target throttle opening tTVO exceeds the target idle opening TVO1, and the determination of the step S30 s changed to be affirmative, the engine controller 31 maintains the target throttle opening tTVO at TVO1 in a step S31. After the processing of the step S31, the engine controller 31 terminates the routine. Accordingly, in the subsequent routine execution, even when the routine is repeatedly executed, the target throttle opening tTVO is maintained at the target idle opening TVO1 without increase.

Meanwhile, in the determination of the step S26, as the target idle rotation attainment flag is unity, the engine controller 31 computes the second ignition timing ADV2 depending on the coolant temperature TW of the internal combustion engine 1 detected by the temperature sensor 37 in a step S32. The second ignition timing ADV2 may be set to, for example, the ignition timing for promoting warm-up of the first catalyst 9 in the cold start-up of the internal combustion engine 1. Alternatively, in order to suppress overshooting of the engine rotation speed by abruptly increasing the intake air amount, a delayed ignition timing may be set temporarily. In this way, the second ignition timing ADV2 is computed as a value delayed from the first ignition timing ADV1.

Then, in a step S33, the engine controller 31 sets the ignition timing instruction value ADV to the value equal to the second ignition timing ADV2.

As a result of the processing described above, when the engine rotation speed Ne reaches the target idle rotation speed NSET, the ignition timing instruction value ADV is switched from the first ignition timing ADV1 to the second ignition timing ADV2 in a stepwise manner.

In a step S34, the engine controller 31 maintains the target throttle opening tTVO equal to the previous value, that is, TVO1. After the processing of the step S34, the engine controller 31 terminates the routine.

In this way, after the engine rotation speed Ne reaches the target idle rotation speed NSET, the ignition timing instruction value ADV is switched to the second ignition timing ADV2 in a stepwise manner. Meanwhile, the target throttle opening tTVO is maintained at the target idle opening TVO1. Here, the ignition timing instruction value ADV is switched to ADV2 at one time in a stepwise manner. However, the ignition timing instruction value ADV may be switched at a predetermined change rate capable of preventing the engine rotation speed from increasing excessively.

Figure 4:
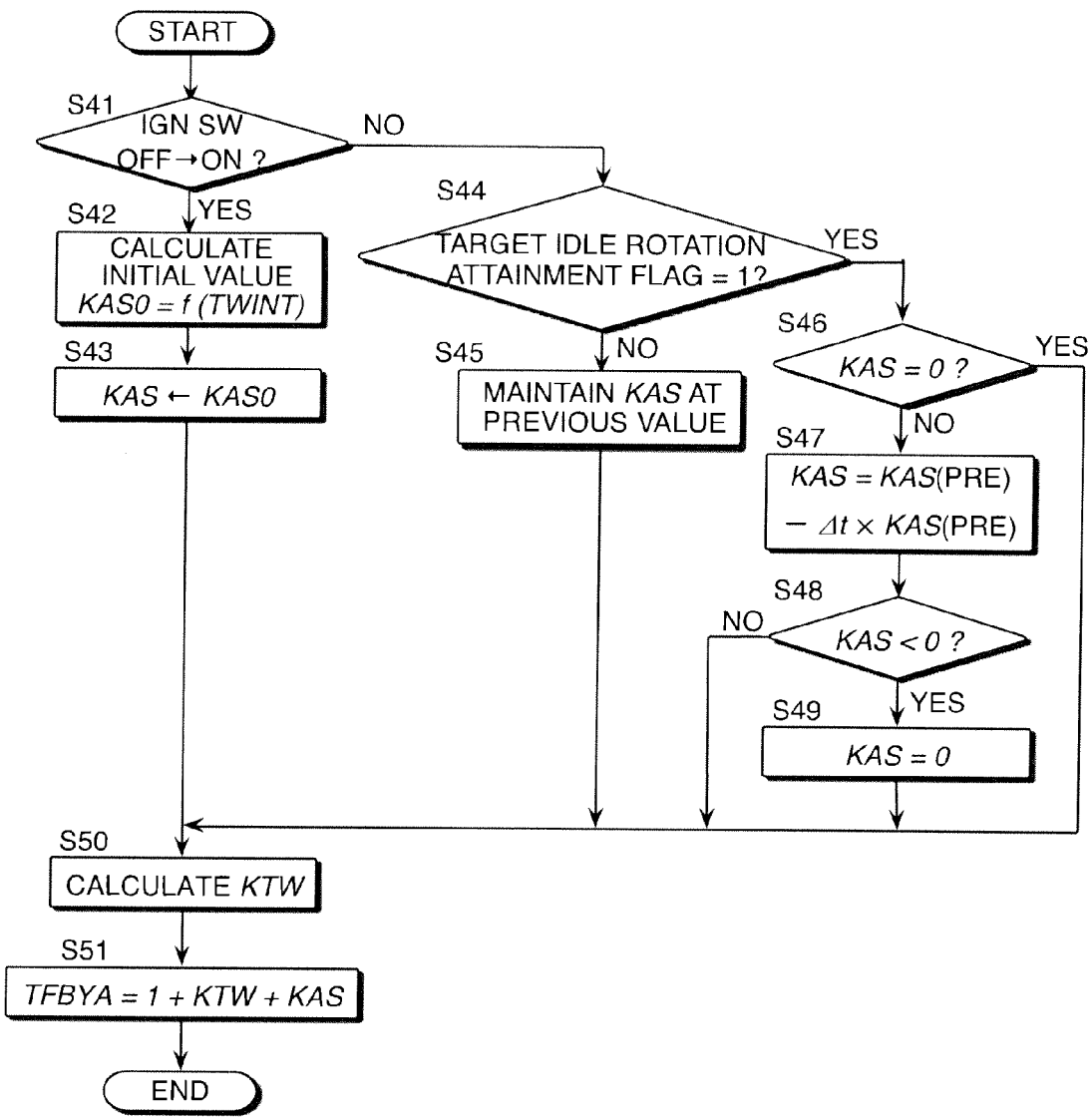
FIG. 4 is a flowchart illustrating a routine for computing a target equivalence ratio executed by the engine controller according to the prior art.

FIG. 4 illustrates a routine for computing a target equivalence ratio TFBYA executed by the engine controller 31. The equivalence ratio corresponds to an inverse of the air-fuel ratio. The engine controller 31 executes this routine at certain intervals, for example, every 100 milliseconds, while the ignition switch is turned on. In addition, the engine controller 31 is activated when the ignition switch is switched from OFF to ON. The engine controller 31 remains operative while the ignition switch is turned on.

In a step S41, the engine controller 31 determines whether or not the current routine execution timing corresponds to the timing immediately after the ignition switch is switched from OFF to ON.

If the determination is affirmative, the engine controller 31 computes an initial value KAS0 of a start-up increment correction coefficient based on the start-up coolant temperature TWINT output from the temperature sensor 37 in a step S42. The initial value KAS0 of the start-up increment correction coefficient increases as the start-up coolant temperature TWINT decreases.

Then, in a step S43, the engine controller 31 sets the start-up increment correction coefficient KAS equal to the initial value KAS0. After the processing of the step S43, the engine controller 31 executes the processing of a step S50.

Meanwhile, if the determination is negative in the step S41, that means the ignition switch is already switched to ON in the routine execution before the previous time. In this case, the engine controller 31 determines whether or not the target idle rotation attainment flag is at unity in a step S44. As described above, the target idle rotation attainment flag is reset to zero when the ignition switch is switched to ON, and the target idle rotation attainment flag is set to unity in the step S8 of FIG. 2. If the target idle rotation attainment flag is at unity, that means the engine rotation speed Ne has reached the target idle rotation speed NSET.

However, if it is determined NO in step S44, the engine controller 31 sets the start-up increment correction coefficient KAS to the previous value in step S45. In this routine, the start-up increment correction coefficient KAS is maintained at the initial value KAS0 until the determination of step S44 is changed to YES. After the processing of step S45, the engine controller 31 executes the processing of step S50.

Meanwhile, if the determination is negative in the step S44, the engine controller 31 determines whether or not the start-up increment correction coefficient KAS is zero in a step S46. As described above, in the step S43 immediately after the start-up of the internal combustion engine 1, the start-up increment correction coefficient KAS is set to the initial value KAS0. Since the start-up increment correction coefficient KAS is set to the initial value KAS0 immediately after the engine rotation speed Ne reaches the target idle rotation speed NSET, the start-up increment correction coefficient KAS is not equal to zero.

In this case, the engine controller 31 sets the start-up increment correction coefficient KAS based on following Equation (2) in a step S47.

$$KAS = KAS(PRE) - \Delta t \times KAS(PRE) \quad (2)$$

where, $\Delta t$=predetermined decrement rate; and
KAS(PRE)=value of start-up increment correction coefficient KAS in the previous routine execution.

Herein, the predetermined decrement rate $\Delta t$ is a value for determining a decrement amount of the start-up increment correction coefficient KAS per predetermined time. This value is appropriately set in advance such that the start-up increment correction coefficient KAS becomes zero when the intake negative pressure is converged to a certain value. The initial value of the KAS(PRE), indicating the previous value of the start-up increment correction coefficient, is set at KAS0.

After the target idle rotation attainment flag changes to unity, the engine controller 31 repeatedly performs the processing of the steps S46 and S47. As a result, the start-up increment correction coefficient KAS gradually decreases. In this regard, in a step S48, the start-up increment correction coefficient KAS is compared with zero. When the start-up increment correction coefficient KAS becomes a negative value, the process advances to a step S49, and the start-up increment correction coefficient KAS is reset to zero. After the processing of the step S49, the engine controller 31 performs the processing of a step S50.

Meanwhile, if the start-up increment correction coefficient KAS is equal to or greater than zero in the determination of the step S48, the engine controller 31 performs the processing of the step S50 without resetting the start-up increment correction coefficient KAS again.

In the step S50, the engine controller 31 computes a coolant increment correction coefficient KTW with reference to a map stored in ROM in advance based on the coolant temperature TW of the internal combustion engine 1. The coolant increment correction coefficient KTW increases as the coolant temperature TW decreases.

Then, in a step S51, the engine controller 31 computes the target equivalence ratio TFBYA based on following Equation (3) using the coolant increment correction coefficient KTW and the start-up increment correction coefficient KAS.

$$TFBYA = 1 + KTW + KAS \quad (3)$$

The target equivalence ratio TFBYA is a value centered at 1.0. After completing the warm-up of the internal combustion engine 1, TFBYA=1 (where KTW=0, and KAS=0). TFBYA=1 corresponds to a fuel mixture of a stoichiometric air-fuel ratio. In the cold start-up of the internal combustion engine 1, the start-up increment correction coefficient KAS is added, so that the target equivalence ratio TFBYA becomes a value exceeding 1.0. The start-up increment correction coefficient KAS is a value obtained by considering a fuel wall flow rate in the cold start-up. Resultantly, the target equivalence ratio TFBYA becomes a value greater than 1.0. Such correction is performed to set the fuel mixture supplied to the combustion chamber 5 to the stoichiometric air-fuel ratio.

Figure 5:
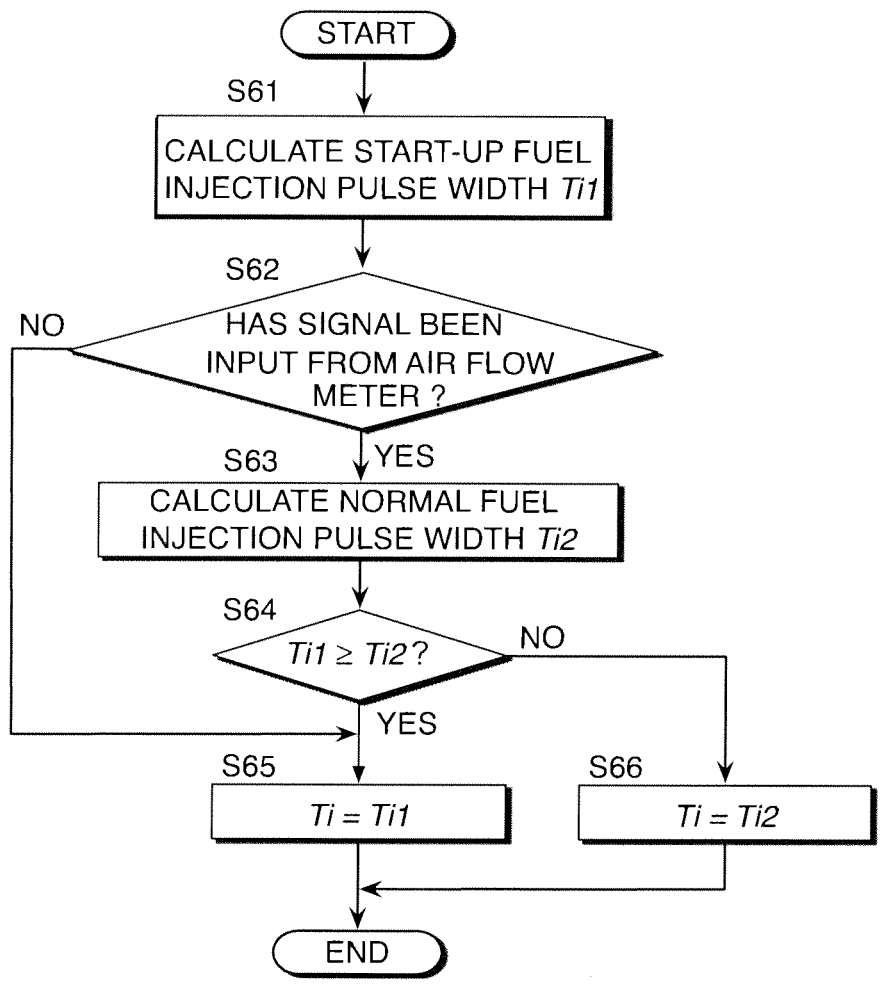
FIG. 5 is a flowchart illustrating a routine for computing a fuel injection pulse width executed by the engine controller according to the prior art.

FIG. 5 illustrates a routine for computing the fuel injection pulse width Ti executed by the engine controller 31. The engine controller 31 executes this routine at certain intervals, for example, every 100 milliseconds while the ignition switch is turned on. The routine for setting the complete combustion flag and the target idle rotation attainment flag in FIG. 2 and the routine for controlling the ignition timing and the throttle opening in FIG. 3 are sequentially executed. Meanwhile, the routine for computing the target equivalence ratio TFBYA in FIG. 4 and the routine for computing the fuel injection pulse width Ti in FIG. 5 are executed in parallel with or independently from the routines of FIGS. 2 and 3. The fuel injection pulse width Ti is a value representative of the fuel injection amount of the fuel injector 21.

In a step S61, the engine controller 31 computes the start-up fuel injection pulse width Ti1 based on following Equation (4).

$$Ti1 = TST \times KNST \times KTST \quad (4)$$

where,
TST=start-up basic injection pulse width;
KNST=rotation speed correction coefficient; and
KTST=time correction coefficient.

Methods of obtaining the start-up basic injection pulse width TST, the rotation speed correction coefficient KNST, and the time correction coefficient KTST are known in the art, and description thereof will be omitted.

In a step S62, the engine controller 31 determines whether or not there is a signal input from the air flow meter 32. If the signal from the air flow meter 32 is not input, the engine controller 31 sets the final fuel injection pulse width Ti equal to the start-up fuel injection pulse width Ti1 in a step S65. After the processing of the step S65, the engine controller 31 terminates the routine.

If there is a signal input from the air flow meter 32, the engine controller 31 computes a normal fuel injection pulse width Ti2 based on following Equation (5) using the target equivalence ratio TFBYA obtained in the most recently executed routine for computing the target equivalence ratio TFBYA of FIG. 4 in a step S63.

$$Ti2 = (Tp \times TFBYA + \text{Kathos}) \times (\alpha + \alpha m - 1) + Ts \quad (5)$$

where,
Ti2=basic injection pulse width,
TFBYA=target equivalence ratio;
Kathos=transitional correction amount;
$\alpha$=air-fuel ratio feedback correction coefficient;
$\alpha m$=air-fuel ratio learning correction coefficient; and
Ts=ineffectual injection pulse width The transient correction amount Kathos is a known correction amount computed basically based on an engine load, an engine rotation speed, and a temperature in a fuel adhering portion in consideration of the fuel wall flow rate of the fuel flowing along the wall surface of the intake port 4. During the start-up of the internal combustion engine 1, the fuel flowing along the wall surface of the intake port 4 out of the fuel injection amount arrives at the combustion chamber 5 with a delay. Therefore, the delay is compensated by increasing the fuel injection amount.

Concepts and computation methods for the air-fuel ratio feedback correction coefficient $\alpha$, the air-fuel ratio learning correction coefficient am, and the ineffectual injection pulse width Ts are known in the art.

The basic injection pulse width Tp is computed based on following Equation (6).

$$Tp = K \times Qa/Ne \quad (6)$$

where, Qa=intake air amount detected by the air flow meter 32.

The constant K in Equation (6) is set such that the air-fuel ratio of the fuel mixture becomes the stoichiometric air-fuel ratio. While the start-up increment correction coefficient KAS is a positive value greater than zero, the fuel injection amount from the fuel injector 21, that is, the fuel injection pulse width Ti is compensated in an increasing manner.

In step S64 to S66, the engine controller 31 compares the start-up fuel injection pulse width Ti1 and the normal fuel injection pulse width Ti2, and the greater one is selected for the final fuel injection pulse width Ti. Then, the engine controller 31 terminates the routine.

The fuel injection pulse width Ti is transmitted to an output register, and the fuel injectors 21 in each cylinder inject fuel into the intake port 4 for a period corresponding to the fuel injection pulse width Ti at a predetermined fuel injection timing.

The control of the ignition timing, the throttle opening, and the fuel injection amount during the start-up of the internal combustion engine 1 is disclosed in JP 2007-278073A, published by Japanese Patent Office in Oct. 25, 2007, the entire content of which is incorporated herein by reference.

Next, description will be made for control of the throttle applied during the start-up of the internal combustion engine 1 according to this invention.

In the prior art described above, the throttle is maintained in a fixed position such as a fully closed position from initiation of cranking to the complete combustion. Here, the "fully closed position" is a generic idiom. In practice, a predetermined gap is set between the throttle 23 and the wall surface of the intake pipe around the throttle 23. For this reason, even when the throttle 23 is in a fully closed position, the air passing through this gap is aspirated into the combustion chamber 5.

If the throttle 23 is maintained in a fixed position from cranking initiation without exception, it may be difficult to obtain an optimal intake air amount depending on an atmospheric pressure and an engine temperature. The reason will be described in detail as follows.

A case where the opening of the throttle 23 at the time of cranking is fixed by assuming a certain reference temperature will be considered. If the engine temperature at the time of cranking initiation is lower than the reference temperature, a frictional resistance of the engine increases, and the engine torque necessary to maintain the idle rotation increases. Therefore, the intake air amount necessary to maintain the idle rotation also increases accordingly.

The atmospheric pressure decreases as a vehicle moves from a lowland area to a highland area. If the opening of the throttle 23 at the time of cranking is not changed, the throttle 23 has a substantially throttled state. In this case, while the intake negative pressure is developed more in comparison with the lowland area, the intake air amount decreases in comparison with the lowland area.

In a case where the throttle opening at the time of cranking of the internal combustion engine 1 is maintained in a fixed position including a fully closed position, start-up performance of the internal combustion engine 1 is unavoidably influenced by the engine temperature and the atmospheric pressure at the time of cranking initiation as described above.

In the cranking initiation, the throttle 23 is first closed in order to generate the intake negative pressure lower than the atmospheric pressure. The opening of the throttle 23 at this time is referred to as an "initial opening" of the throttle 23. According to this invention, influences of such factors are excluded by setting the initial opening of the throttle 23 to a different value depending on the engine temperature and the atmospheric pressure at the time of cranking initiation.

Description will be made for start-up control of the internal combustion engine 1, including the aforementioned control executed by the engine controller 31 according to this invention, with reference to FIGS. 6 to 10.

The engine controller 31 executes the ignition timing control routine of FIG. 6, the flag setting routine of FIG. 7, and the throttle control routine of FIG. 8 instead of the routine of FIG. 3, subsequently to the routine for setting the complete combustion flag and the target idle rotation attainment flag of FIG. 2 according to the prior art, while the ignition switch is turned on. Meanwhile, similar to the prior art, the routine for computing the target equivalence ratio TFBYA of FIG. 4 and the routine for computing the fuel injection pulse width Ti of FIG. 5 are executed in parallel with and independently from the routine of FIG. 2.

Figure 6:
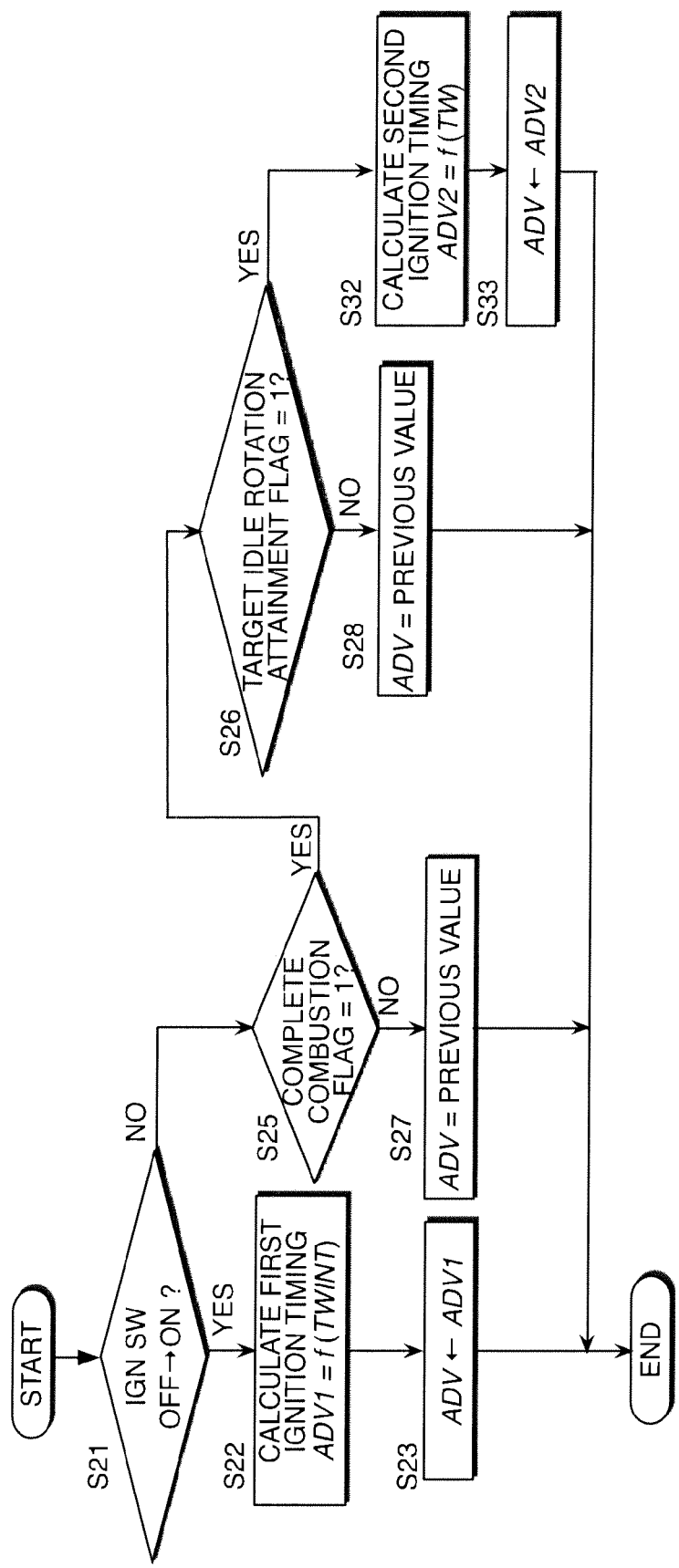
FIG. 6 is a flowchart illustrating a routine for controlling an ignition timing executed by an engine controller according to this invention.

The routine for computing the ignition timing instruction of FIG. 6 is obtained by deleting steps S24, S30, S31, and S34 relating to the throttle control from the routine according to the prior art in FIG. 3. In this routine, the engine controller 31 performs control of the throttle 23 using the routines of FIGS. 7 and 8 by controlling only the ignition timing of the spark plug 14.

Figure 7:
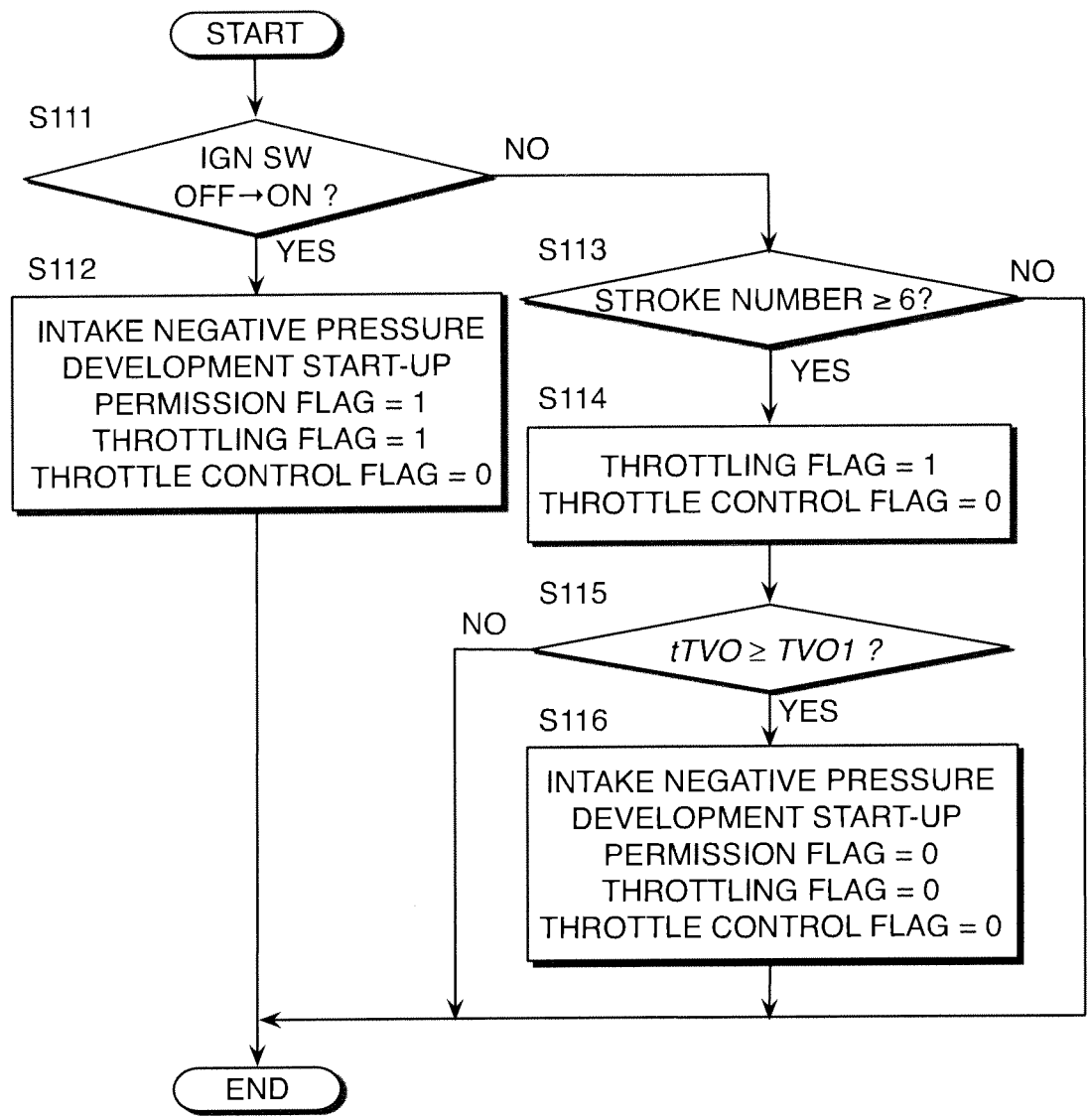
FIG. 7 is a flowchart illustrating a flag setting routine executed by the engine controller according to this invention.

The flag setting routine of FIG. 7 is executed subsequently to the routine for computing the ignition timing of FIG. 6

Referring to FIG. 7, in a in step S111, the engine controller 31 determines whether or not the current routine execution timing is immediately after the ignition switch is switched from OFF to ON. If the determination is affirmative, the engine controller 31 sets the intake negative pressure development start-up permission flag, the throttling flag, and the throttle control flag to unity, unity, and zero, respectively, in a step S112 and terminates the routine.

If the determination is negative in the step S111, the engine controller 31 determines whether or not the number of strokes from cranking initiation is equal to or greater than a predetermined number six in a step S113.

If the number of strokes is smaller than the predetermined number six, the engine controller 31 terminates the routine without executing further steps. If the number of strokes is equal to or greater than the predetermined number six, the engine controller 31 sets the throttling flag and the throttle control flag to zero and unity, respectively, in a step S114.

Here, the meaning of comparison between the number of strokes and the predetermined number six will be described.

In the start-up of the internal combustion engine 1, it is preferable that the throttle 23 be opened when the actual intake negative pressure becomes sufficient to promote vaporization of fuel, and the intake air amount necessary to maintain the target idle rotation speed is obtained. The intake negative pressure at this time is referred to as an intake negative pressure opening request threshold value. In the prior art described above, the target throttle opening tTVO increases in the step S29 by assuming that the intake negative pressure opening request threshold value is reached when the complete combustion flag is changed to unity in the step S25 of FIG. 3. However, the intake negative pressure at the time of cranking significantly pulsates. Therefore, even when the intake negative pressure has increased to the intake negative pressure opening request threshold value, the subsequent intake negative pressure may decrease immediately thereafter. Herein, the decrease of the intake negative pressure means pressure increase to the atmospheric pressure.

If the intake throttle 23 is opened at this timing, subsequent development of the intake negative pressure is suppressed, so that the intake negative pressure makes fluctuates near the intake negative pressure opening request threshold value. If the intake negative pressure does not increase over the intake negative pressure opening request threshold value, vaporization of fuel is not sufficiently promoted, and it is difficult to suppress increase of hydrocarbons (HC) generated in a large amount during the cold start-up.

In order not to hinder development of the intake negative pressure, it is preferable to consider that the timing at which the intake negative pressure secondly reaches the intake negative pressure opening request threshold value after cranking initiation corresponds to the timing at which the actual intake negative pressure becomes sufficient to promote vaporization of fuel while the intake air amount necessary to maintain the target idle rotation speed is obtained. This timing is set as a timing for starting to open the throttle 23. The predetermined value six represents the number of strokes from cranking initiation corresponding to this timing in a case of 4-cylinder or 8-cylinder engines.

The number of strokes corresponding to the timing at which the intake negative pressure secondly reaches the intake negative pressure opening request threshold value is obtained as a predetermined value through experiment or simulation in advance. Therefore, the predetermined value is not limited to six.

In a step S115, the engine controller 31 determines whether or not the target throttle opening tTVO reaches the target idle opening TVO1.

If the determination is negative, the engine controller 31 terminates the routine immediately.

If the determination is affirmative, the engine controller 31 resets both the intake negative pressure development start-up permission flag and the throttle control flag to zero and maintains the throttling flag in a zero state in a step S116.

Through the routine execution described above, opening of the throttle 23 is not initiated until the number of strokes reaches a predetermined value six after cranking initiation, and opening of the throttle 23 is initiated as the number of strokes reaches six.

Figure 8:
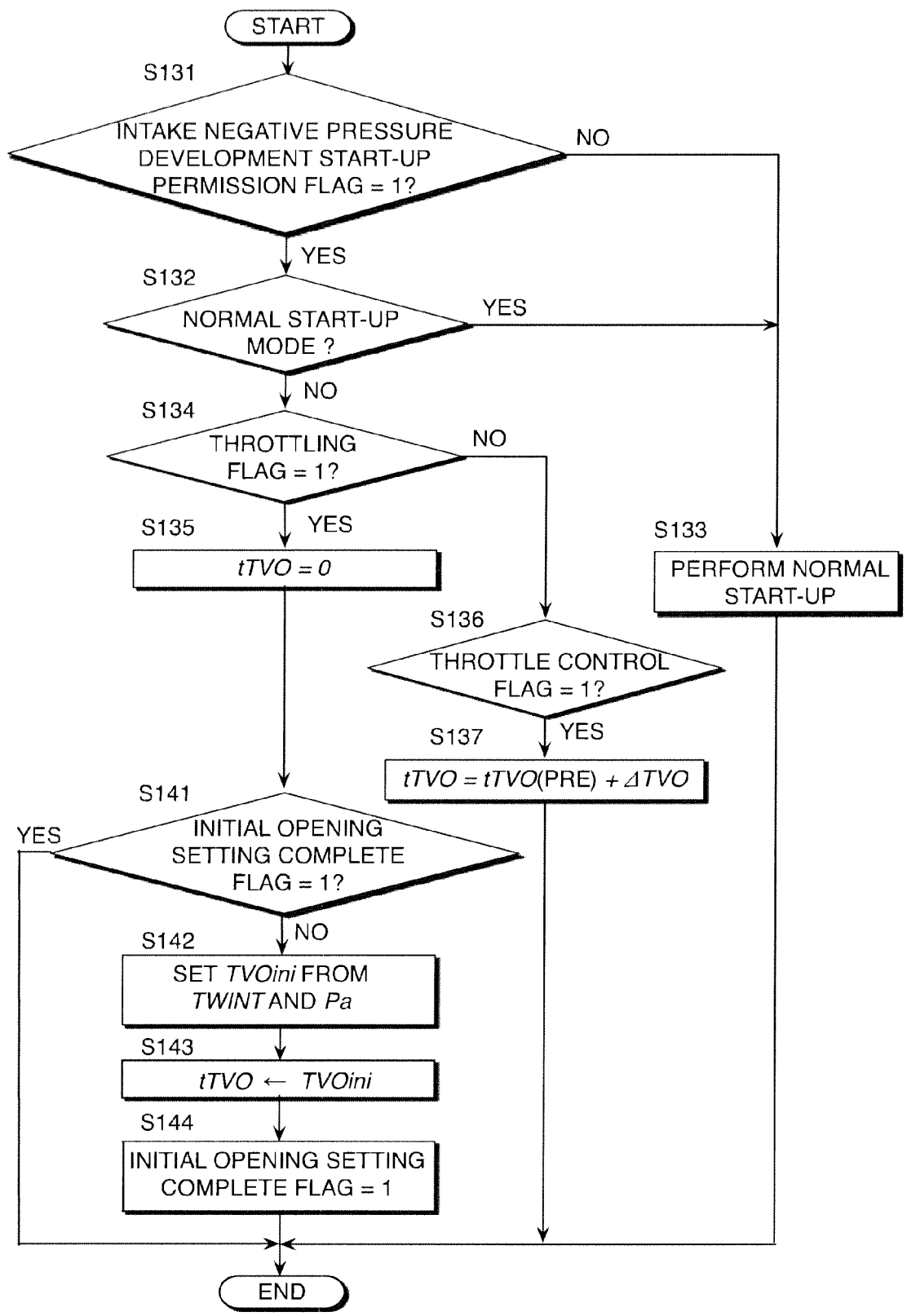
FIG. 8 is a flowchart illustrating a routine for controlling a throttle opening executed by the engine controller according to this invention.

The throttle control routine of FIG. 8 is executed subsequently to the flag setting routine of FIG. 7.

Referring to FIG. 8, in a step S131, the engine controller 31 determines whether or not the intake negative pressure development start-up permission flag is at unity. If the intake negative pressure development start-up permission flag is at unity, the engine controller 31 determines whether or not a start-up mode corresponds to a normal start-up mode in a step S132.

The normal start-up mode means that the internal combustion engine 1 performs start-up in a high-temperature state. The normal start-up mode is applied when a driver performs a start-up operation immediately after driving of the internal combustion engine 1 stops or when the start-up of the internal combustion engine 1 is performed in a warm-up state caused by remaining heat in the previous driving, such as restarting from an idle stop state. In this case, the development of the intake negative pressure is not necessary. Since this invention focuses on the cold start-up of the internal combustion engine 1 necessitating development of the intake negative pressure, the control according to this invention is not performed in the normal start-up mode, and the normal start-up is performed in a step S133 instead.

Since the normal start-up means the start-up control applied to a case where the internal combustion engine 1 does not necessitate warm-up, the engine controller 31 performs the normal start-up in the step S133 when the start-up mode corresponds to the normal start-up mode even if the intake negative pressure development start-up permission flag is unity in the step S131. After the processing of the step S133, the engine controller 31 terminates the routine.

When a cold start-up of the internal combustion engine 1 is performed, the determination of the step S132 becomes negative.

In this case, the engine controller 31 determines whether or not the throttling flag is at unity in a step S134. If the throttling flag is at unity, the engine controller 31 performs the processing subsequent to a step S141.

Meanwhile, if the throttling flag is at zero, the engine controller 31 determines the throttle control flag in a step S136. If the throttle control flag is at unity, the target throttle opening tTVO is computed based on Equation (1) described above in a step S137. After the processing of the step S137, the engine controller 31 terminates the routine.

In the step S141, the engine controller 31 determines whether or not the initial opening setting complete flag is at unity. The initial value of the initial opening setting complete flag is zero. In other words, the initial opening setting complete flag is reset to zero as the ignition switch or the starter switch is switched from OFF to ON.

If the initial opening setting complete flag is at zero, the engine controller 31 sets the initial opening of the throttle 23 in steps S142 to S144. That is, in the step S142, the initial opening TVOini of the throttle 23 is set based on the coolant temperature TWINT (hereinafter, referred to as a start-up coolant temperature) detected by the temperature sensor 37 at the time of cranking initiation and the atmospheric pressure Pa detected by the pressure sensor 38 at the time of cranking initiation with reference to the map illustrated in FIG. 9. The start-up coolant temperature TWINT is used as a value representative of the engine temperature at the time of engine start-up.

The inner side of the collector 2 is maintained in the atmospheric pressure Pa at the time of cranking initiation. Therefore, the pressure detected by the pressure sensor 38 at the time of cranking initiation is equal to the atmospheric pressure Pa. In this manner, since the atmospheric pressure Pa at the time of cranking initiation is detected using the pressure sensor 38 for detecting the intake pressure, it is not necessary to separately provide a dedicated pressure sensor for detecting the atmospheric pressure.

Figure 9:
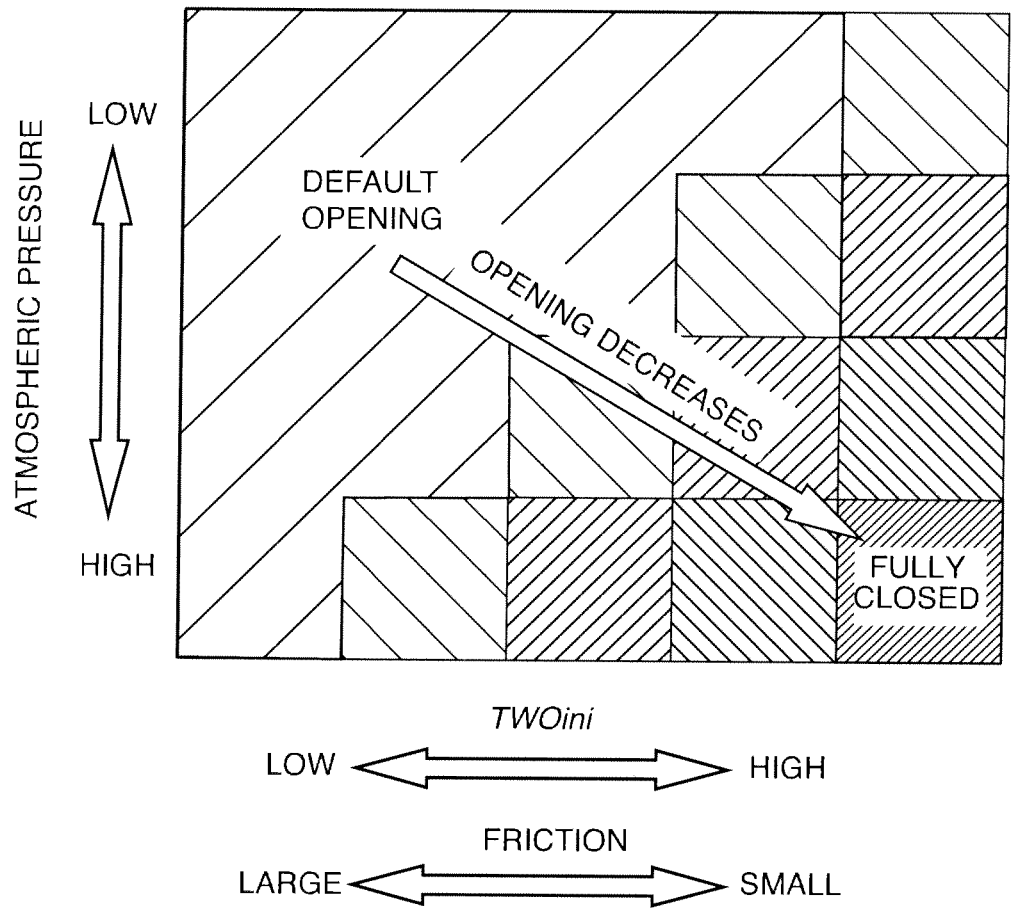
FIG. 9 is a diagram illustrating a characteristic of a map of an initial opening TVOini of a throttle according to this invention.

Referring to FIG. 9, a characteristic of the map is set such that the initial opening TVOini of the throttle 23 decreases as the start-up coolant temperature TWINT increases when the atmospheric pressure Pa is constant, and the throttle 23 has a fully closed position when the start-up coolant temperature TWINT is at its highest point. In addition, it is assumed that the throttle 23 has a default opening when the start-up coolant temperature TWINT is at its lowest point. As the start-up coolant temperature TWINT decreases, the frictional resistance of the engine 1 increases, and start-up performance is degraded. As the start-up coolant temperature TWINT decreases, the initial opening TVOini of the throttle 23 increases, so that it is possible to increase the torque generated by the engine against the frictional resistance by increasing the intake air amount during the cranking.

Meanwhile, in a case where the coolant temperature TWINT at the time of start-up is constant, the characteristic of the map is set such that the initial opening TVOini of the throttle 23 increases as the atmospheric pressure Pa decreases. In a highland area where the atmospheric pressure Pa is low, the air density decreases, and the substantial intake air amount is reduced in comparison with a lowland area where the atmospheric pressure Pa is high. As a result, the torque generated by the engine is reduced, and start-up performance is degraded. In a highland area where the atmospheric pressure Pa is low, reduction of the torque generated by the engine is prevented by increasing the initial opening TVOini of the throttle 23 and the intake air amount in order to compensate substantial reduction of the intake air amount.

The pressure sensor 38 is installed in the intake collector 2 to detect the intake negative pressure after the engine start-up. Immediately before the cranking initiation, the inner side of the intake collector 2 has the atmospheric pressure. Therefore, at the cranking initiation timing, the pressure detected by the pressure sensor 38 is equal to the atmospheric pressure.

As a parameter for determining the initial opening TVOini of the throttle 23, a temperature of engine oil at the time of cranking initiation or a temperature of transmission oil at the time of cranking initiation may be used instead of the start-up coolant temperature TWINT. Since the atmospheric pressure is a value representative of the atmospheric air density, the air density may be directly detected.

Through execution of the routines described above, the initial opening TVOini of the throttle 23, which is an opening until the number of strokes reaches a predetermined number six after cranking initiation, is set depending on the start-up coolant temperature TWINT and the atmospheric pressure Pa.

Next, effects caused by execution of the routines in FIGS. 6 to 8 will be described with reference to FIGS. 10A to 10F and FIGS. 11A to 11F.

FIGS. 10A to 10F illustrate the engine rotation speed, the air-fuel ratio, the throttle opening, the intake negative pressure, the engine torque, and the fuel injection amount, respectively, in the cold start-up of the internal combustion engine 1. In FIGS. 10A to 10F, the solid lines relate to a case where the routines of FIGS. 6 to 8 are applied to a normal-temperature start-up, and the single-dotted lines relate to a case where the routines of FIGS. 6 to 8 are executed in a low-temperature start-up. The broken lines relate to a case where the throttle opening at the time of start-up is fixed without applying this invention. The abscissa denotes time elapsed after cranking initiation.

Both the normal-temperature start-up and the low-temperature start-up refer to types of cold start-up of the internal combustion engine 1, and are distinguished depending on the engine temperature at the time of cranking initiation. The engine temperature at the time of cranking initiation is nearly equal to the atmospheric temperature. Specifically, the normal-temperature start-up is a type of cold start-up of the internal combustion engine 1 at a normal temperature, and the low-temperature start-up is a type of cold start-up of the internal combustion engine 1 at a low temperature. A case where the internal combustion engine 1 is restarted in a warm-up state caused by remaining heat in the previous driving, for example, a case where the internal combustion engine 1 is restarted immediately after the driving stops is referred to as the normal start-up mode as described above, which is distinguished from the cold start-up.

However, at the time of normal-temperature start-up, the initial opening TVOini of the throttle 23 obtained from the start-up coolant temperature TWINT in the step S142 of FIG. 8 with reference to the map of FIG. 9 is set to a relatively low value as indicated by the solid line of FIG. 10C. For this reason, as illustrated in FIG. 10D, it is possible to sufficiently promote development of the intake negative pressure and obtain desirable effects to promote vaporization of the injected fuel. In addition, by setting the initial opening TVOini to a low value, it is possible to control the intake air amount to a value suitable for complete combustion. As a result, it is possible to suppress excessive increase in the rotation speed exceeding the target idle rotation speed as illustrated in FIG. 10A and reduce the fuel injection amount necessary in the start-up as illustrated in FIG. 10F. In addition, by assuming that the timing at which the actual intake negative pressure becomes sufficient to promote vaporization of fuel and the intake air amount necessary to maintain the target idle rotation speed is obtained is equal to the timing at which the intake negative pressure secondly reaches the intake negative pressure opening request threshold value, and by setting the timing for starting to open the throttle 23 to this timing, it is possible to prevent the air-fuel ratio from becoming excessively lean as illustrated in FIG. 10B.

Meanwhile, in the low-temperature start-up, the initial opening TVOini of the throttle 23 obtained in the step S142 of FIG. 8 based on the map of FIG. 9 is set to a value higher than that of the normal-temperature start-up as indicated by the single-dotted line of FIG. 10C. In the low-temperature start-up, a frictional resistance of the engine 1 increases, and start-up performance is degraded. In this case, the engine torque increases from initial combustion by increasing the initial opening TVOini of the throttle 23 to increase the intake air amount during cranking as illustrated in FIG. 10E. Therefore, smooth start-up of the internal combustion engine 1 against the frictional resistance is reliably obtained.

If the initial opening TVOini is large, it is difficult to develop the intake negative pressure. Vaporization of the injected fuel is promoted by developing the intake negative pressure. Therefore, in the low-temperature start-up, an effect of promoting vaporization of the injected fuel is reduced in comparison with the normal-temperature start-up, and an effect of preventing the lean air-fuel ratio is limitative as illustrated in FIG. 10B. However, even in this case, a certain desirable effect is also obtained for development of the intake air pressure in comparison with a case where the throttle 23 starts to be opened from the default opening before the initial combustion without applying this invention as illustrated in the broken line of FIG. 10B.

FIGS. 11A to 11F illustrate the engine rotation speed, the air-fuel ratio, the throttle opening, the intake negative pressure, the engine torque, and the fuel injection amount, respectively, in the start-up of the internal combustion engine 1. In FIGS. 11A to 11F, the solid lines relate to a case where the routines of FIGS. 6 to 8 are applied to the start-up in a lowland area where the atmospheric pressure is high, and the single-dotted lines relate to a case where the routines of FIGS. 6 to 8 are applied to the start-up in a highland area where the atmospheric pressure is low. The broken lines relate to a case where the throttle opening is fixed at the time of start-up without applying this invention. The abscissa denotes time elapsed after cranking initiation.

Figure 11A:
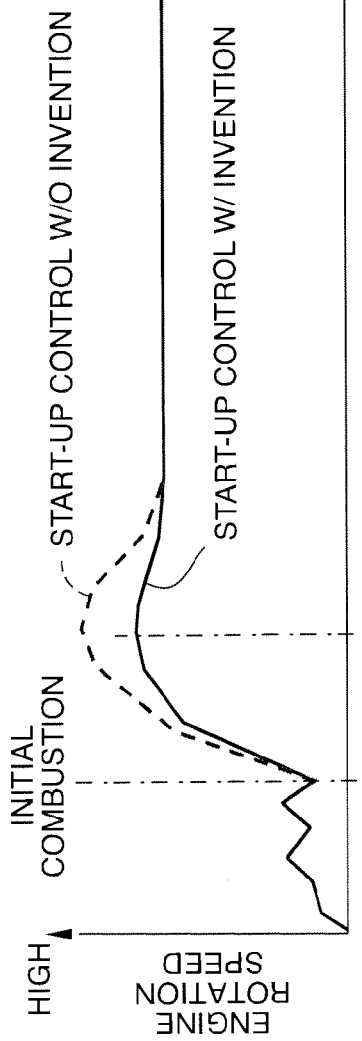
Figure 11B:
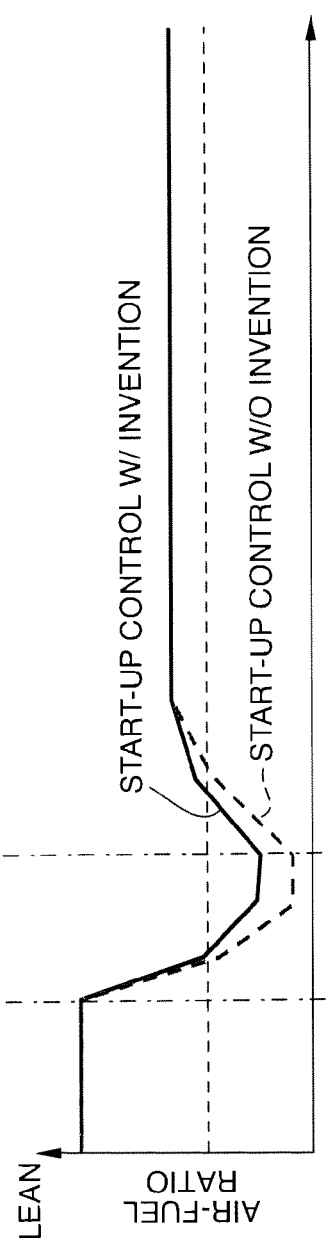
Figure 11C:
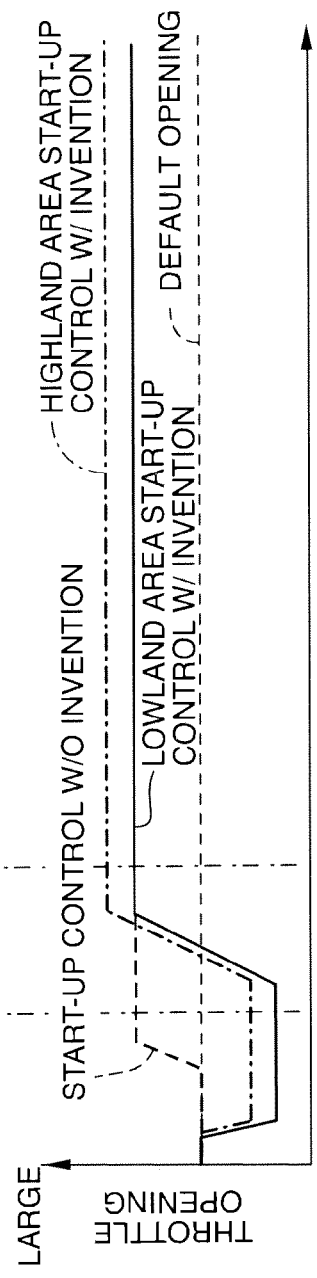

In the start-up in a lowland area where the atmospheric pressure is high, the initial opening TVOini of the throttle 23 obtained in the step S142 of FIG. 8 based on the start-up coolant temperature Tini with reference to the map of FIG. 9 is set to a relatively low value as indicated by the solid line of FIG. 11C. For this reason, as illustrated in FIG. 11D, it is possible to sufficiently promote development of the intake negative pressure and obtain a desirable effect to promote vaporization of the injected fuel. In addition, by setting the initial opening TVOini to a low value, it is possible to control the intake air amount to a value suitable for complete combustion. As a result, it is possible to suppress excessive increase in the rotation speed exceeding the target idle rotation speed as illustrated in FIG. 11A and reduce the fuel injection amount necessary in the start-up as illustrated in FIG. 11F. In addition, by assuming that the timing at which the actual intake negative pressure becomes sufficient to promote vaporization of fuel and the intake air amount necessary to maintain the target idle rotation speed is obtained is equal to the timing at which the intake negative pressure secondly reaches the intake negative pressure opening request threshold value, and by setting the timing for starting to open the throttle 23 to this timing, it is possible to prevent the air-fuel ratio from becoming excessively lean as illustrated in FIG. 11B.

Meanwhile, in the start-up in a highland area where the atmospheric pressure is low, the initial opening TVOini of the throttle 23 obtained in the step S142 of FIG. 8 with reference to the map of FIG. 9 is set to a value higher than that of the start-up in a lowland area as indicated by the single-dotted line in FIG. 11C. In a highland area where the atmospheric pressure Pa is low, the air density is lower than that of a lowland area where the atmospheric pressure Pa is high, and the substantial intake air amount is reduced. As a result, the engine torque is reduced, and start-up performance is degraded. In this regard, if the initial opening TVOini of the throttle 23 increases, the intake air amount increases from the initial combustion, and it is possible to compensate substantial reduction of the intake air amount caused by the air density. As a result, reduction of the engine torque is suppressed, and smooth start-up of the internal combustion engine 1 is reliably obtained.

If the initial opening TVOini is large, it is difficult to develop the intake negative pressure. Vaporization of the injected fuel is promoted by developing the intake negative pressure. Therefore, in the low-temperature start-up, an effect of promoting vaporization of the injected fuel is reduced in comparison with the normal-temperature start-up, and an effect of preventing the lean air-fuel ratio becomes limitative as illustrated in FIG. 11B. However, even in this case, a certain desirable effect is also obtained for development of the intake air pressure in comparison with a case where the throttle 23 starts to be opened from the default opening before initial combustion without applying this invention as indicated by the broken line of FIG. 11B.

Through the control described above, it is possible to promote development of the intake negative pressure at the time of cold start-up of the internal combustion engine 1 and supply the air amount necessary to maintain the idle rotation speed with an optimal balance regardless of a temperature and an atmospheric pressure. According to this embodiment, the initial opening TVOini is set by using parameters such as the atmospheric pressure Pa and the start-up coolant temperature TWINT as the engine temperature at the time of start-up of the internal combustion engine 1. However, it is possible to also obtain similar effects by setting the initial opening TVOini based on only one of the start-up coolant temperature TWINT and the atmospheric pressure Pa.

The contents of Tokugan 2010-290176, with a filing date of Dec. 27, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, according to this invention, it is possible to improve cold start-up performance of the internal combustion engine. A preferable effect is therefore expected when this invention is applied to vehicle engines used in various start-up environments.

The embodiments of this invention in which an exclusive property or privilege is claimed are defined as follows:

The invention claimed is:

1. A method of controlling start-up of an internal combustion engine that has a throttle for controlling an intake air amount and performs the start-up through cranking, the method comprising:
    detecting cranking initiation of the internal combustion engine;
    detecting an atmospheric pressure at the time of cranking initiation of the internal combustion engine;
    setting an initial opening based on the atmospheric pressure at the time of cranking initiation, wherein the initial opening is narrower than a predetermined target idle opening;
    controlling a throttle opening of the throttle to the initial opening at the time of cranking initiation; and
    starting to increase the throttle opening of the throttle from the initial opening toward the predetermined target idle opening at a predetermined timing after cranking initiation,
    wherein the initial opening is set to a lower value as the atmospheric pressure increases.

2. The method as defined in claim 1, wherein the initial opening is set to a lower value as the engine temperature at the time of cranking initiation increases.

3. The method as defined in claim 1, further comprising counting the number of strokes or the number of revolutions from cranking initiation of the internal combustion engine, wherein the predetermined opening timing is set to a timing at which the count reaches a predetermined number.

4. The method as defined in claim 3, wherein the predetermined number is set in advance so as to develop an actual intake negative pressure and obtain an intake air amount necessary to maintain a target idle rotation speed later.

5. The method as defined in claim 4, further comprising determining whether or not the rotation speed of the started internal combustion engine reaches the target idle rotation speed and delaying an ignition timing if the determination is affirmative.

6. An apparatus for controlling start-up of an internal combustion engine that has a throttle for controlling an intake air amount and performs the start-up through cranking, the apparatus comprising:
    a sensor that detects cranking initiation of the internal combustion engine;
    a sensor that detects an atmospheric pressure at the time of cranking initiation of the internal combustion engine; and
    a programmable controller programmed to:
        set an initial opening based on the atmospheric pressure at the time of cranking initiation, wherein the initial opening is narrower than a predetermined target idle opening;
        control a throttle opening of the throttle to the initial opening at the time of cranking initiation, and
        start to increase the throttle opening of the throttle from the initial opening toward the predetermined target idle opening at a predetermined timing after cranking initiation,
    wherein the initial opening is set to a lower value as the atmospheric pressure increases.

* * * * *